(12) United States Patent
Johri et al.

(10) Patent No.: US 9,630,626 B2
(45) Date of Patent: Apr. 25, 2017

(54) SYSTEM AND METHOD FOR MANAGING HYBRID VEHICLE REGENERATIVE BRAKING

(71) Applicant: FORD GLOBAL TECHNOLOGIES, LLC, Dearborn, MI (US)

(72) Inventors: Rajit Johri, Ann Arbor, MI (US); Xiaoyong Wang, Novi, MI (US); Francis Thomas Connolly, Ann Arbor, MI (US); Daniel Scott Colvin, Farmington Hills, MI (US); Mark Steven Yamazaki, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 14/199,408

(22) Filed: Mar. 6, 2014

(65) Prior Publication Data
US 2015/0251657 A1 Sep. 10, 2015

(51) Int. Cl.

| | |
|---|---|
| *B60L 9/00* | (2006.01) |
| *B60W 10/08* | (2006.01) |
| *B60W 30/18* | (2012.01) |
| *B60L 7/10* | (2006.01) |
| *B60L 7/18* | (2006.01) |
| *B60L 7/14* | (2006.01) |
| *B60L 11/14* | (2006.01) |
| *B60L 11/18* | (2006.01) |
| *B60L 15/20* | (2006.01) |

(52) U.S. Cl.
CPC ......... *B60W 30/18127* (2013.01); *B60L 7/10* (2013.01); *B60L 7/14* (2013.01); *B60L 7/18* (2013.01); *B60L 11/14* (2013.01); *B60L 11/1862* (2013.01); *B60L 15/2054* (2013.01); *B60L 2240/421* (2013.01); *B60L 2240/423* (2013.01); *B60L 2240/507* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01)

(58) Field of Classification Search
USPC ................................................. 701/22; 477/4
See application file for complete search history.

(56) References Cited

U.S. PATENT DOCUMENTS

| | | | |
|---|---|---|---|
| 5,895,100 A | 4/1999 | Ito et al. | |
| 5,927,829 A | 7/1999 | Saga et al. | |
| 5,951,614 A | 9/1999 | Tabata et al. | |
| 6,081,042 A | 6/2000 | Tabata et al. | |
| 6,176,808 B1 | 1/2001 | Brown et al. | |
| 6,376,927 B1 * | 4/2002 | Tamai .................... | B60K 6/383 290/31 |

(Continued)

*Primary Examiner* — Tyler Paige
(74) *Attorney, Agent, or Firm* — David B. Kelley; Brooks Kushman P.C.

(57) ABSTRACT

A vehicle includes a powertrain having an electric machine configured to selectively apply regenerative braking torque to decelerate the vehicle. The vehicle also includes a controller programmed to control a rate of change of a regenerative braking torque limit during a transmission downshift that occurs during a regenerative braking event based on a change in speed of an output shaft of the powertrain caused by the transmission downshift.

15 Claims, 3 Drawing Sheets

(56) References Cited

U.S. PATENT DOCUMENTS

| | | | |
|---|---|---|---|
| 6,719,076 B1 | 4/2004 | Tabata et al. | |
| 7,167,783 B2 | 1/2007 | Park et al. | |
| 7,673,714 B2 | 3/2010 | Soliman et al. | |
| 7,891,450 B2 | 2/2011 | Soliman et al. | |
| 7,976,427 B2 | 7/2011 | Yamamoto et al. | |
| 8,060,287 B2 | 11/2011 | Headlee et al. | |
| 8,272,991 B2 | 9/2012 | Katsuta et al. | |
| 2002/0116101 A1 | 8/2002 | Hashiba et al. | |
| 2007/0102208 A1 | 5/2007 | Okuda et al. | |
| 2007/0205036 A1* | 9/2007 | Ogata | B60K 6/48 180/337 |
| 2007/0216312 A1* | 9/2007 | Ogata | B60K 6/48 315/131 |
| 2007/0219045 A1* | 9/2007 | Ogata | B60K 6/48 477/3 |
| 2009/0145673 A1* | 6/2009 | Soliman | B60K 6/442 180/65.1 |
| 2009/0150035 A1* | 6/2009 | Soliman | B60K 6/442 701/54 |
| 2011/0000721 A1* | 1/2011 | Hassett | B60K 6/48 180/65.22 |
| 2012/0065849 A1* | 3/2012 | Thor | F16H 61/061 701/53 |
| 2012/0265382 A1 | 10/2012 | Nefcy et al. | |
| 2013/0289809 A1* | 10/2013 | Treharne | B60L 1/003 701/22 |
| 2013/0296100 A1* | 11/2013 | Nefcy | B60W 10/08 477/4 |
| 2014/0025244 A1* | 1/2014 | Hancock | B60K 6/52 701/22 |
| 2014/0200111 A1* | 7/2014 | Murakami | B60K 6/48 477/4 |

* cited by examiner

SYSTEM AND METHOD FOR MANAGING HYBRID VEHICLE REGENERATIVE BRAKING

TECHNICAL FIELD

This disclosure relates to hybrid powertrain control systems. More specifically, the disclosure relates to regenerative braking controls.

BACKGROUND

Vehicles having automatic transmissions change gear ratios based on vehicle speed and driver acceleration demand. During deceleration automatic transmissions shift through progressively lower gear ratios. The smoothness of the shifting from a given gear to the next adjacent gear influences noise, vibration, and harshness as perceived by the driver.

Hybrid vehicles may employ one or more electric machines having a motor-generator in combination with an internal combustion engine. Depending on vehicle operating conditions, the electric machine may selectively alternate between serving as a motive power source, or a decelerating load upon the powertrain. The timing and magnitude of this alternate operation of the electric machine may serve to optimize fuel economy, and should coincide with the operation of the transmission.

SUMMARY

In at least one embodiment, a vehicle includes a powertrain having an electric machine configured to selectively apply regenerative braking torque to decelerate the vehicle. The vehicle also includes a controller programmed to control a rate of change of a regenerative braking torque limit during a transmission downshift that occurs during a regenerative braking event based on a change in speed of an output shaft of the powertrain caused by the transmission downshift.

In at least one embodiment, a vehicle includes a traction battery and a powertrain having a transmission and an electric machine configured to selectively apply regenerative braking torque to both decelerate the vehicle and recharge the battery in response to braking demand. The vehicle also includes a controller programmed to (i) control a rate of change of a regenerative braking torque limit based on a minimum of either a motor torque capability or a recharging demand of the battery, and (ii) adjust the limit during a transmission downshift event based on a change in speed of an output shaft of the powertrain caused by the transmission downshift.

In at least one embodiment, a method of controlling regenerative braking includes causing an electric machine to apply regenerative braking torque, and limiting the command based on a speed of the electric machine during a regenerative braking event. The method further includes controlling a rate of change of the limit during a regenerative braking event and a transmission downshift based on a change in speed of a powertrain output shaft.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
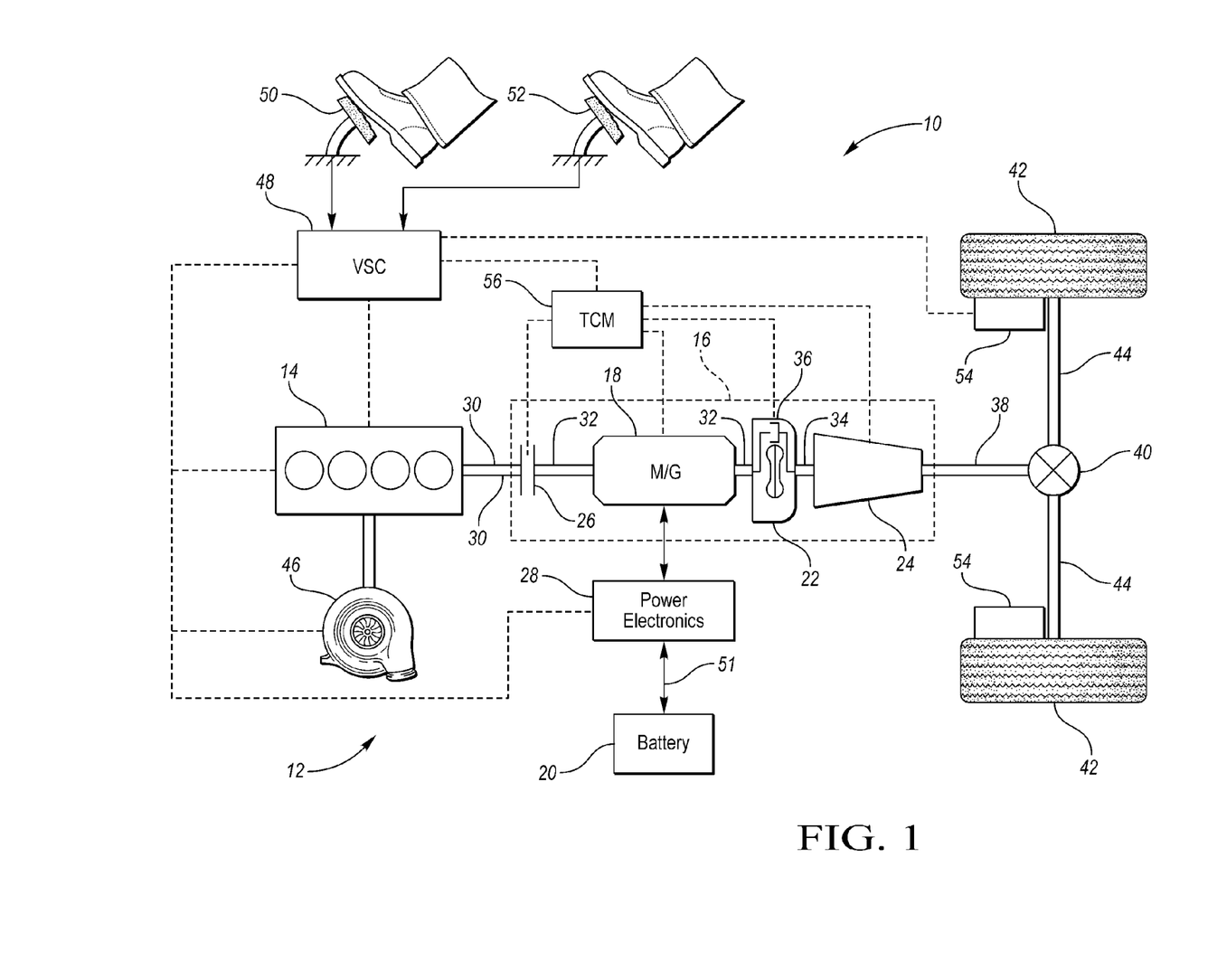
FIG. 1 is a schematic of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The vehicle 10 includes a powertrain 12. The powertrain 12 includes an engine 14 that drives a transmission 16. As will be described in further detail below, the transmission 16 includes an electric machine such as an electric motor/generator (M/G) 18, a torque converter 22, and a multiple step-ratio automatic transmission, or gearbox 24. There is also a traction battery 20 in connection with the M/G 18 for providing power to, and receiving power from, the M/G 18.

The engine 14 and the M/G 18 are both capable of providing motive power for the HEV 10. The engine 14 generally represents a power source which may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 28 condition direct current (DC) power provided by the battery 20 to the requirements of the M/G 18, as will be described below. For example, power electronics may provide three phase alternating current (AC) to the M/G 18.

The engine 14 may additionally be coupled to a turbocharger 46 to provide an air intake pressure increase, or "boost" to force a higher volume of air into a combustion chamber of the engine 14. Related to the increased air pressure provided to the engine 14 by the turbocharger 46, a corresponding increase in the rate of fuel combustion may be achieved. The additional air pressure boost therefore allows the engine 14 to achieve additional output power, thereby increasing engine torque.

The gearbox 24 may include internal gear sets (not shown) that are placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a gearbox input shaft 34 and the transmission output shaft 38. The gearbox 24 ultimately provides the powertrain output torque through the output shaft 38. For example, there may be two series of clutches, where each corresponds to odd-numbered or even-numbered gear sets. During shifting from a current gear ratio to an adjacent requested gear ratio, a clutch from the first series is concurrently disengaged while a clutch from the second series is engaged. Once the transfer from the first to the second clutch is completed as part of a gear shift, both the speed ratio and torque ratio between the transmission output shaft 38 and the transmission input shaft 34 changes according to the gear selection.

As further shown in the representative embodiment of FIG. 1, the output shaft 38 is connected to a differential 40. The differential 40 drives a pair of wheels 42 via respective axles 44 connected to the differential 40. The differential transmits torque allocated to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The vehicle 10 further includes a foundation brake system 54. The brake system may comprise friction brakes suitable to selectively apply pressure by way of stationary pads attached to a rotor affixed to each wheel. The applied pressure between the pads and rotors creates friction to resist rotation of the vehicle wheels 42, and is thereby capable of slowing the speed of vehicle 10.

When the disconnect clutch 26 is at least partially engaged, power flow from the engine 14 to the M/G 18 or from the M/G 18 to the engine 14 is possible. For example, when the disconnect clutch 26 is engaged, the M/G 18 may operate as a generator to convert rotational energy provided by a crankshaft 30 through M/G shaft 32 into electrical energy to be stored in the battery 20. As discussed in more detail below, the rotational resistance imparted on the shaft through regeneration of energy may be used as a brake to decelerate the vehicle. The disconnect clutch 26 can also be disengaged to decouple the engine 14 from the remainder of the powertrain 12 such that the M/G 18 can operate as the sole drive source for the vehicle 10.

Operation states of the powertrain 12 may be dictated by at least one controller. In at least one embodiment, there is a larger control system including several controllers. The individual controllers, or the control system, may be influenced by various other controllers throughout the vehicle 10, where a vehicle system controller (VSC) 48 operates at a higher hierarchy relative to other subservient controllers. The VSC 48 output may directly or indirectly dictate or influence a number of vehicle functions such as starting/stopping engine 14, operating the M/G 18 to provide wheel torque or recharge the traction battery 20, select or schedule transmission gear shifts, etc. For example, the VSC 48 may receive data from, and issue commands to, a transmission control module (TCM) 56 that is in direct communication with components of the transmission 16. Examples of other subservient controllers that may operate lower in a controller hierarchy compared to the VSC 48 include a brake system control module (BSCM), a high voltage battery energy control module (BECM), an inverter system controller (ISC), as well as other controllers in communication which are responsible for various vehicle functions. In at least one embodiment, the BECM and the ISC are included within the power electronics 28. The VSC 48 may further operate to verify data received from other controllers.

Any of the above-mentioned controllers may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The VSC 48 and other controllers communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the VSC 48 may communicate signals to and/or from the TCM 56. Additionally, the VSC 48 may communicate with other vehicle controllers as discussed above, or directly with vehicle sensor and/or components including the engine 14, the turbocharger 46, the power electronics 28, and the braking system 54. The power electronics 28 may comprise both the ISC and the BECM that manage power flow to and from the battery 20. Although not explicitly illustrated, those of ordinary skill in the art will recognize various functions or components that may be controlled by the VSC 48 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, torque converter bypass clutch 36, and transmission gearbox 24, and the like. Sensors communicating input through the I/O interface may be used to indicate turbocharger boost pressure, turbocharger rotation speed, crankshaft position, engine rotational speed (RPM), M/G shaft speed, powertrain output shaft speed, wheel speeds, engine coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch status, deceleration, or shift mode, for example.

The VSC 48 also includes a torque control logic feature. The VSC 48 is capable of interpreting driver requests based on several vehicle inputs. These inputs may include, for example, gear selection (PRNDL), accelerator pedal inputs, brake pedal input, battery temperature, voltage, current, and battery state of charge (SOC). The VSC 48 in turn may issue command signals to the TCM 56 and/or the power electronics 28 to influence the operation of the M/G 18.

The M/G 18 is also in connection with the torque converter 22 via shaft 32. Therefore the torque converter 22 is also connected to the engine 14 when the disconnect clutch 26 is at least partially engaged. The torque converter 22 includes an impeller fixed to the M/G shaft 32 and a turbine fixed to a transmission input shaft 34. The torque converter 22 provides a hydraulic coupling between shaft 32 and transmission input shaft 34. An internal bypass clutch 36 may also be provided torque converter such that, when engaged, clutch 36 frictionally or mechanically couples the impeller and the turbine of the torque converter 22, permitting more efficient power transfer. The torque converter 22 and its bypass clutch 36 may be replaced with a launch clutch to provide vehicle launch. In contrast, when the bypass clutch 36 is disengaged, the M/G 18 may be mechanically decoupled from the differential 40 and the vehicle axles 44. For example, during deceleration the bypass clutch 36 may disengage at low vehicle speeds, decoupling the engine from the transmission and driveline, to allow the engine to idle and operate at low vehicle speeds or stop.

A driver of the vehicle 10 may provide input at accelerator pedal 50 and create a demanded torque, power, or drive command to propel the vehicle 10. In general, depressing and releasing the pedal 50 generates an accelerator input signal that may be interpreted by the VSC 48 as a demand for increased power or decreased power, respectively. Based at least upon input from the pedal, the controller 48 may allocate torque commands between each of the engine 14 and/or the M/G 18 to satisfy the vehicle torque output demanded by the driver. The controller 48 may also control the timing of gear shifts within the gearbox 24, as well as engagement or disengagement of the disconnect clutch 26 and the torque converter bypass clutch 36. The torque converter bypass clutch 36 can be modulated across a range between the engaged and disengaged positions. This may produce a variable slip in the torque converter 22 in addition to the variable slip produced by the hydrodynamic coupling between the impeller and the turbine. Alternatively, the torque converter bypass clutch 36 may be operated as either locked or open without using a modulated operating mode depending on the particular application.

The driver of vehicle 10 may additionally provide input at brake pedal 52 to create a vehicle braking demand. Depressing brake pedal 52 generates a braking input signal that is interpreted by controller 48 as a command to decelerate the vehicle. The VSC 48 may in turn issue commands to cause the application of negative torque to the powertrain output shaft 38. Additionally or in combination, the controller may issue commands to activate the brake system 54 to apply friction brake resistance to inhibit rotation of the vehicle wheels 42. The negative torque values provided by both of the powertrain and the friction brakes may be allocated to vary the amount by which each satisfies driver braking demand.

The M/G 18 may operate as a generator to convert kinetic energy from the powertrain 12 into electric energy to be stored in the battery 20. The M/G 18 may act as a generator while the engine 14 is providing the sole propulsion power for the vehicle 10, for example. The M/G 18 may additionally act as a generator during times of regenerative braking in which rotational energy from the spinning of the output shaft 38 is transferred back through the gearbox 24, and is converted into electrical energy for storage in the battery 20.

During a regenerative braking event, the M/G may selectively apply a drag, or negative torque, to contribute to vehicle deceleration. At the same time, the transmission may undergo gear downshifts according to the reduction in vehicle speed. As discussed above, both the speed ratio and the torque ratio between the transmission input and output are adjusted during a downshift. Rotational inertia of the components may cause a time lag between the two different ratio changes. For example, a transmission gear downshift causes a more rapid response in the change in torque ratio as compared to the change in speed ratio.

It should be understood that the schematic illustrated in FIG. 1 is merely exemplary and is not intended to be limiting. Other configurations are contemplated that utilize selective engagement of both an engine and a motor to transmit through a transmission. For example, the M/G 18 may be offset from the crankshaft 30, and/or an additional motor may be provided to start the engine 14. Other configurations are contemplated without deviating from the scope of the present disclosure.

Figure 2:
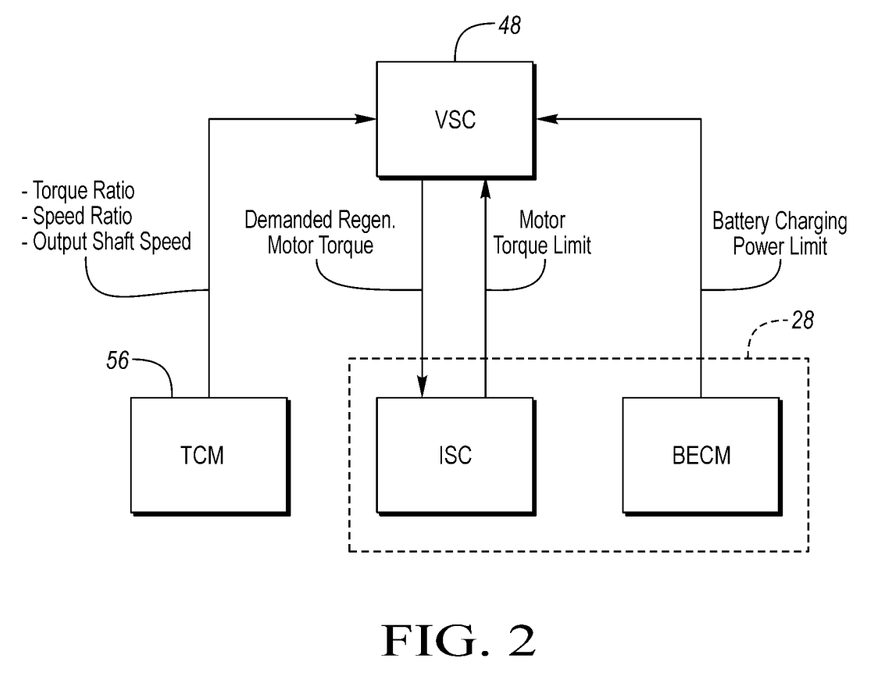
FIG. 2 is a block diagram of the information flow between controllers of the vehicle.

Referring to FIG. 2, a block diagram depicts an example of the information flow between several of the controllers discussed above. The VSC 48 receives signals from, and issues commands to, subservient controllers in the vehicle system. The TCM 56 monitors the transmission torque ratio, the transmission speed ratio, the powertrain shaft output speed, and the M/G shaft speed. The TCM 56 further provides a signal representing each of the monitored aspects to the VSC 48.

Both the ISC and the BECM may be part of the power electronics 28. The BECM may monitor the state of the battery and provide a signal indicative of the limit of the power to be provided to the battery based at least on the SOC of the battery. At higher SOC conditions, less charging is required, and therefore less power may be demanded from the M/G during regenerative braking. At lower SOC conditions, a recharging demand of the battery may be increased causing a higher battery charging limit to be provided by the BECM. The ISC may provide a signal representative of the maximum available regenerative braking torque based at least on the capability of the inverter to provide current to the battery. Based on the operating state of the transmission and the various limits provided by subservient controllers, the VSC may issue a command signal for an appropriate magnitude of regenerative braking torque from the M/G.

The transmission downshift event during deceleration can generally be divided into two phases. The first phase is a torque phase where the powertrain torque ratio is increased. However there is a lag, or time delay, before the transmission speed ratio changes. During a second, inertia phase the torque changes flow through the powertrain system and the speed ratio changes according to the transmission gearing change. During the torque phase, the output torque changes more rapidly according to the engagement of clutches within the transmission.

The magnitude of regenerative torque available to be delivered by the M/G is a function of the rotational speed of the motor shaft. Related to the lag in speed change versus torque change during downshifts described above, the motor rotational speed may not be the most responsive indicator to use for prompting commands for the motor braking torque. The lag may be perceived by a vehicle driver through effects of out-of-date motor braking commands. As the transmission torque ratio changes, there is an increase in resistive torque at the vehicle wheels. This may be compounded with the motor regenerative braking torque during the time before the motor shaft speed is reduced. The compounded resistive torque may be perceivable as a variation in total powertrain output, or "shift shock." During regenerative braking, the negative torque applied to the driveline is desired to be as steady as possible to provide smooth, controlled braking. By using the powertrain output shaft speed as an indicator of the imminent rotational speed of the M/G, a more responsive control strategy may be employed that reduces or avoids the lag that exists in speed ratio changes during transmission downshifts.

According to the present disclosure, an appropriate limit on the motor regenerative torque is calculated based on the powertrain output shaft rotational speed. During gear ratio shifts, the driveline output changes before the motor rotational speed is adjusted. This lag can cause a surges in the regenerative braking torque related to motor torque being based on an out of date input. Other braking compensation may be available, for example by attempting to time a decrease or an increase in friction braking and/or engine output. However, it may be more advantageous to reduce or eliminate the response lag in M/G speed. An instantaneous M/G response can be approximated by determining the maximum regenerative braking torque limit based on driveline output shaft speed and the transmission torque ratio following a downshift.

A calculation of the limit of regenerative braking torque limit at the wheels provided by the M/G, $\tau_{regen}$, may be performed using equation (1).

$$\tau_{regen} = -1 * \min\left(\tau_{gen}, \frac{P_{charger}}{\omega_{MOTOR}}\right) * r_{trans} \tag{1}$$

$\tau_{gen}$ is the M/G torque capability limit based on the maximum current capable of delivery through the inverter, which may be communicated to the VSC by the ISC. $P_{charger}$ is the battery charging power limit based on a battery recharging demand, which may be communicated to the VSC by the BECM. $\omega_{MOTOR}$ is the rotational speed of the shaft of the M/G. $r_{trans}$ is the transmission torque ratio including the final drive ratio of the differential, gear ratio of the gearbox, and torque converter ratio. In practice, the minimum of either the M/G torque limit $\tau_{gen}$ or the battery charging power limit $P_{charger}$ can dictate the overall commanded regenerative braking limit commanded by the VSC. In the case where the $\tau_{gen}$ is larger than $$\frac{P_{charger}}{\omega_{MOTOR}},$$

equation (1) can be rewritten as equation (2).

$$\tau_{regen} = -1 * \frac{P_{charger}}{\omega_{MOTOR}} * r_{trans} \tag{2}$$

During a transmission gear change, $\omega_{MOTOR}$ changes once the inertia phase is complete. However the change of the transmission torque ratio $r_{trans}$ has already occurred by the end of the earlier torque phase. According to the present disclosure, a virtual speed of the M/G $\omega_{V\_MOTOR}$, as shown in equation (3), can be used in lieu of the actual speed of the M/G.

$$\omega_{V\_MOTOR} = \omega_{OS} * \frac{r_{trans}}{r_{final\ drive}} \tag{3}$$

$\omega_{OS}$ is the rotational speed of the powertrain output shaft, and $r_{final\ drive}$ is the final drive ratio of the of the differential. The differential final drive ratio is fixed for a given vehicle, and does not fluctuate during downshifts. By replacing $\omega_{MOTOR}$ with $\omega_{V\_MOTOR}$ in equation (1), a new regenerative braking torque limit calculation is provided in equation (4).

$$\tau_{regen} = -1 * \frac{P_{chrarger}}{\omega_{V\_MOTOR}} * r_{trans} = -1 * \frac{P_{charger}}{\omega_{OS}} * r_{final\ drive} \tag{4}$$

It can be seen from equation (4) that the regenerative braking torque limit $\tau_{regen}$ can be calculated independent of both the change in speed ratio, as well as the change in torque ratio. Using the above substitution of a virtual speed of the M/G allows the regenerative braking limit calculation to depend solely on powertrain output shaft speed $\omega_{OS}$. By implementing this adjustment to the limit calculation, the time delay between the change in transmission torque ratio and the change in the speed of the M/G shaft may be overlooked. Therefore, the regenerative braking torque limit calculation can be provided in a more smooth fashion during transmission downshifts.

In one respect, the use of the virtual speed of the M/G as an indicator to control the regenerative braking limit approximates using a forecasted transmission ratio after the downshift. The use of a more up-to-date input parameter downstream in the powertrain can operate as a forecasted value for imminent changes that have yet to occur upstream in the powertrain.

FIGS. 3A through 3F correspond in time, and depict various powertrain operating conditions according to the present disclosure. Each plot shows a different vehicle response over time to a transmission downshift during regenerative braking. The present disclosure allows the M/G to operate in a forecasted domain.

Figure 3A:
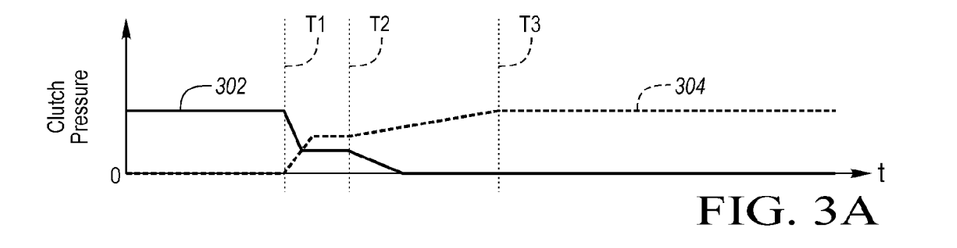
FIGS. 3A through 3E are associated time plots of vehicle operating parameters during regenerative braking.

FIG. 3A depicts the transition between clutches during a transmission downshift. The vertical axis represents the magnitude of clutch pressure between fully engaged and disengaged. Initially, a first clutch is fully engaged with maximum pressure, represented by curve 302. A transmission gear shift is initiated at time T1. As discussed above, the initial phase of the downshift between T1 and T2 is the "torque phase" of the gear shift. The first clutch pressure begins to reduce, at the same time that a second clutch pressure is increased. The second clutch pressure is represented by curve 304. By the time the transmission has progressed through the "inertia phase" of the gear shift denoted by T2 to T3, the second clutch is fully engaged and the first clutch is disengaged. The change in engagement of the clutches causes a prompt change in the torque ratio of the transmission.

Figure 3B:
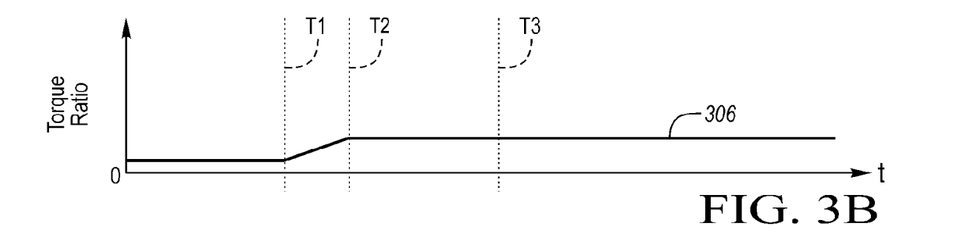

FIG. 3B represents the ratio of input torque to output torque of the transmission. Curve 306 shows that the torque ratio of the transmission increases with a gear downshift. It can be seen from FIG. 3B that the change in torque ratio of the transmission occurs during the earlier torque phase of the transmission gear shift between T1 and T2.

Figure 3C:
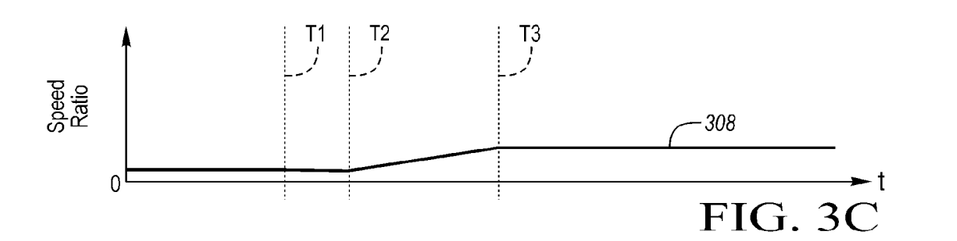

FIG. 3C represents the ratio of output shaft speed to input shaft speed of the transmission. Curve 308 represents the speed ratio. It can be seen from FIG. 3C that the change in speed ratio occurs during the later inertia phase of the transmission gear downshift between T2 and T3. Comparison of FIGS. 2 and 3 demonstrate the time lag between the completion of the change in torque ratio and the change in speed ratio.

Figure 3D:
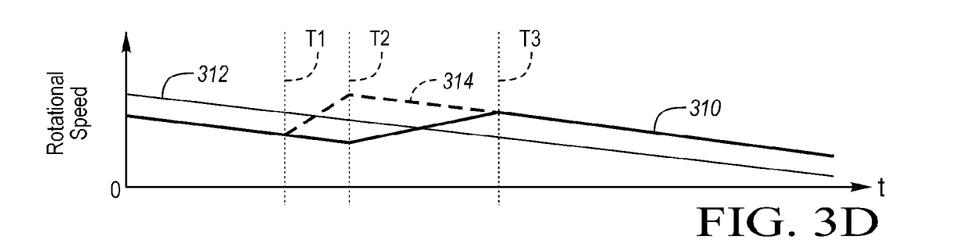

FIG. 3D is a plot of the rotational speeds of the M/G output shaft and the powertrain output shaft. The mechanical advantage of the transmission gearing allows for an increase or a reduction of the speed from the input to the output. Curve 310 represents the rotational speed of the shaft between the M/G and the transmission. Curve 312 represents the rotational speed of the powertrain output shaft between the transmission and the vehicle wheels. In the example plot of FIG. 3D, the gear ratio changes from an overdrive condition to a gear reduction condition. In the initial portion of the plot, the speed of the output of the transmission shown by curve 312 is greater than the speed of the shaft of the M/G, curve 310. This initial portion may be referred to as the overdrive portion where the output speed is faster than the input speed. Following the gear shift the relationship changes, and the M/G shaft speed 310 becomes greater than the powertrain output shaft speed 312. It should be appreciated that not all downshift gear changes result in a change from overdrive to reduction. It is contemplated that the disclosed aspects apply to reduce shift shock effects from a downshift from any particular gear.

Related to the timing of the change in the transmission speed ratio, the change in the M/G shaft speed 310 occurs during the inertia phase of the transmission gear shift. Dotted portion 314 represents the virtual M/G shaft speed as discussed above. The virtual M/G speed of dotted portion 314 can be a responsive indicator to cause a prompt regenerative braking limit change corresponding to the initial torque phase of the transmission gear shift. A lag in the braking response of the M/G may be reduced or avoided by employing a virtual M/G shaft speed that changes concurrently with the change in the torque ratio of the transmission.

Figure 3E:
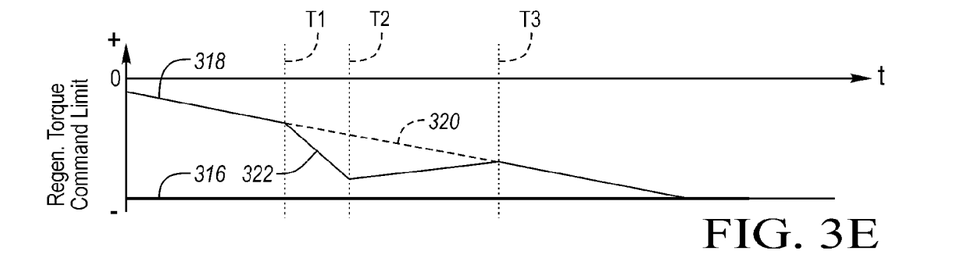

FIG. 3E is a plot of a limit for the regenerative braking torque command for the M/G. Curve 316 represents the M/G torque limit based on the maximum current available from the inverter, described above as $\tau_{gen}$. In the example of FIG. 3E, the M/G minimum torque limit curve 316 is generally constant. Curve 318 represents the M/G torque limit based on the speed of the shaft of the M/G. The limit generally varies according the rotational speed of the shaft of the M/G described above as curve 310. The plot provides a visual example that the command for regenerative braking torque can be dominated by the lesser of the two absolute limits shown as curve 316 and curve 318. The implementation of the virtual M/G speed operates to modify the M/G torque limit prior to the change of the speed of the shaft of the M/G.

It can be seen from FIG. 3E that the rate of change of the limit based on speed of the M/G increases during the torque phase between T1 and T2 related to the change in transmission torque ratio prior to change in speed of the M/G. More specifically portion 322 of the torque command limit curve 318 shows a sudden decrease in the limit during the torque phase of the transmission downshift event. The rate of decrease of the limit can be controlled by employing the virtual speed of the M/G as described above. Portion 320 corresponds to a modification of the regenerative braking torque command limit based on the virtual M/G speed as opposed to the actual M/G speed during a transmission downshift and a regenerative braking event. Less than the full regenerative braking torque capability of the M/G is available during the modification of the limit. A smoother transition in the braking limit may be provided by adjusting the M/G regenerative braking limit command during transmission downshift events. This is in part because the virtual M/G speed changes concurrently with the change in transmission torque ratio providing a more up-to-date input to govern the regenerative braking torque command limit.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain system for a vehicle comprising:
a powertrain having an electric machine configured to selectively apply regenerative braking torque to decelerate the vehicle; and
a controller programmed to control a rate of change of a regenerative braking torque limit during a transmission downshift that occurs during a regenerative braking event based on a change in speed of an output shaft of the powertrain caused by the transmission downshift.

2. The system of claim 1 wherein a rate of decrease of the limit during the transmission downshift is generally equal to a rate of decrease of the limit during the event before the transmission downshift.

3. The system of claim 1 wherein in the controller is further programmed to, before the transmission downshift, issue a signal indicative of a regenerative braking torque limit based on a speed of a shaft of the electric machine.

4. The system of claim 1 wherein the controller is further programmed to apply a virtual speed of the electric machine to control a rate of decrease of the limit during a torque phase of the transmission downshift.

5. The system of claim 4 wherein the virtual speed of the electric machine is based on the speed of the output shaft of the powertrain and a forecasted transmission ratio after the transmission downshift.

6. The system of claim 1 wherein a rate of decrease of the limit is reduced to avoid a compounding of the regenerative braking torque with changes in transmission torque ratio during the transmission downshift.

7. A powertrain system for a vehicle comprising:
a battery;
a powertrain having a transmission and an electric machine configured to selectively apply regenerative braking torque to both decelerate the vehicle and recharge the battery in response to braking demand; and
a controller programmed to (i) control a rate of change of a regenerative braking torque limit based on a minimum of either a motor torque capability or a recharging demand of the battery, and (ii) adjust the limit during a transmission downshift event based on a change in speed of an output shaft of the powertrain caused by the transmission downshift event.

8. The system of claim 7 wherein the limit is adjusted based on a virtual speed of the electric machine such that the adjustment to the limit occurs during a torque phase of the transmission downshift event.

9. The system of claim 8 wherein the virtual speed is based on the speed of the output shaft and a forecasted transmission ratio after the transmission downshift event.

10. The system of claim 7 wherein the adjustment to the limit is based on a virtual speed of the electric machine such that that less than a full motor torque capability is available for vehicle deceleration during the transmission downshift event.

11. The system of claim 7 wherein the regenerative braking torque limit is adjusted such that regenerative braking torque is not compounded with a change in transmission torque ratio.

12. A method of controlling regenerative braking comprising:
causing an electric machine to apply regenerative braking torque;
limiting the regenerative braking torque based on a speed of the electric machine during a regenerative braking event; and
controlling a rate of change of the limit during the regenerative braking event and a transmission downshift based on a change in speed of a powertrain output shaft.

13. The method of claim 12 wherein controlling the rate of change of the limit further comprises reducing the rate of change of the limit during a torque phase of the transmission downshift to accommodate changes in transmission torque ratio.

14. The method of claim 12 wherein controlling the rate of change of the limit is further based on a virtual speed of the electric machine such that the rate of change of the limit is reduced prior to the transmission downshift causing a change of an actual speed of the electric machine.

15. The method of claim 14 wherein the virtual speed is based on the speed of the powertrain output shaft and a forecasted transmission ratio after the transmission downshift.

* * * * *